(12) United States Patent
Wang et al.

(10) Patent No.: US 8,371,167 B2
(45) Date of Patent: Feb. 12, 2013

(54) IN-PLANE SENSOR, OUT-OF-PLANE SENSOR, AND METHOD FOR MAKING SAME

(75) Inventors: Chuan Wei Wang, HsinChu (TW); Sheng Ta Lee, HsinChu (TW)

(73) Assignee: Pixart Imaging Inc., Hsin-Chu (TW)

( * ) Notice: Subject to any disclaimer, the term of this patent is extended or adjusted under 35 U.S.C. 154(b) by 226 days.

(21) Appl. No.: 12/535,492

(22) Filed: Aug. 4, 2009

(65) Prior Publication Data

US 2010/0024549 A1   Feb. 4, 2010

Related U.S. Application Data

(63) Continuation-in-part of application No. 12/220,847, filed on Jul. 29, 2008, now Pat. No. 7,989,247.

(51) Int. Cl.
*G01P 15/125* (2006.01)
(52) U.S. Cl. .................. 73/514.32; 73/514.38
(58) Field of Classification Search ............... 73/514.32, 73/514.38
See application file for complete search history.

(56) References Cited

U.S. PATENT DOCUMENTS

| | | | |
|---|---|---|---|
| 5,326,726 A | 7/1994 | Tsang et al. | |
| 5,814,727 A * | 9/1998 | Matsuda | 73/514.17 |
| 5,847,280 A | 12/1998 | Sherman et al. | |
| 5,880,369 A | 3/1999 | Samuels et al. | |
| 6,230,566 B1 * | 5/2001 | Lee et al. | 73/514.32 |
| 6,840,106 B1 * | 1/2005 | McNeil | 73/514.32 |
| 6,877,374 B2 | 4/2005 | Geen | |
| 6,892,576 B2 | 5/2005 | Samuels et al. | |
| 6,909,158 B2 * | 6/2005 | Yoshioka et al. | 257/414 |
| 6,936,492 B2 * | 8/2005 | McNeil et al. | 438/50 |
| 7,578,190 B2 * | 8/2009 | Lin et al. | 73/514.32 |
| 8,056,415 B2 * | 11/2011 | McNeil et al. | 73/514.32 |
| 2008/0141774 A1 * | 6/2008 | Classen et al. | 73/514.32 |

* cited by examiner

*Primary Examiner* — John Chapman, Jr.
(74) *Attorney, Agent, or Firm* — Tung & Associates

(57) ABSTRACT

According to the present invention, an in-plane sensor comprises a structure unit which includes: a fixed structure including a fixed finger and a fixed column connected to each other, the fixed finger having a supported end supported by the fixed column and a suspended end; and a movable structure including at least one proof mass which surrounds the fixed finger in a horizontal plane.

16 Claims, 18 Drawing Sheets

IN-PLANE SENSOR, OUT-OF-PLANE SENSOR, AND METHOD FOR MAKING SAME

CROSS REFERENCE TO RELATED APPLICATIONS

This application is a continuation-in-part application of U.S. patent application Ser. No. 12/220,847, filed on Jul. 29, 2008 now U.S. Pat. No. 7989247.

BACKGROUND

1. Field of Invention

The present invention relates to an in-plane sensor, an out-of-plane sensor, and a method for making the in-plane sensor and the out-of-plane sensor, which reduce the impact of the residual stress in the manufacturing process to the sensors.

2. Description of Related Art

An in-plane sensor senses the capacitance variation resulting from a change of the distance between two electrodes, and generates a corresponding signal. Such in-plane sensor may be used in, e.g., an accelerometer or a gyro sensor. Related art can be found in, e.g., U.S. Pat. Nos. 5,326,726; 5,847,280; 5,880,369; 6,877,374; and 6,892,576.

All of the above cited prior art include the same drawback, as described below. Referring to FIG. 1, such micro-electro-mechanical device typically includes one or more fixed structures 50 and one movable structure 60. The fixed structure 50 includes multiple fixed fingers 52 which are suspended but fixed to fixed columns 58. The fixed fingers 52 are interconnected with each other by the fixed columns 58 and connection parts 56. The fixed columns 58 are fixed to an underlying substrate (not shown). The movable structure 60 includes a proof mass body 62, extending fingers 64, connection parts 66 and anchors 68. The movable structure 60 (including the proof mass body 62, the extending fingers 64, and the connection parts 66) is suspended except the anchor 68 which is also fixed to the underlying substrate. When the overall device moves, the movement causes a change in the distance between the suspended portion of the movable structure 60 and the fixed structure 50, i.e., the distance between the fixed fingers 52 and the extending fingers 64 changes. As the fixed fingers 52 and the extending fingers 64 are the two electrodes of a capacitor, the capacitance of the capacitor correspondingly changes. Thus, by measuring the capacitance, the direction, speed and acceleration of the movement of the overall device can be calculated. These data can provide important information in the field applied to by the micro-electro-mechanical device.

Referring to FIG. 2 which is a cross-sectional view taken along the X-X section of FIG. 1, because both the fixed finger 52 and the extending finger 64 are suspended, they are very easily warped during semiconductor manufacturing process. In this case the overlapping area between the fixed finger 52 and the extending finger 64 significantly decreases, reducing the effective capacitance between them. Hence, it is desired to improve the structure of such micro-electro-mechanical device so that it is less impacted by the process.

SUMMARY

In view of the foregoing drawback, it is a first objective of the present invention to provide an in-plane sensor with reduced impact of the residual stress in the manufacturing process to the sensor.

It is a second objective of the present invention to provide a method for making an in-plane sensor.

It is a third objective of the present invention to provide an out-of-plane sensor.

In accordance with the foregoing and other objectives of the present invention, and from one aspect of the present invention, an in-plane sensor comprises: a fixed structure including a fixed finger and a fixed column connected to each other, the fixed finger having a supported end supported by the fixed column and a suspended end which is unsupported; and a movable structure including at least one proof mass and an extending finger connected to each other; wherein the supported end of the fixed finger is closer to the proof mass than the suspended end is.

From another aspect of the present invention, an in-plane sensor comprises: a fixed structure including a fixed finger and a fixed column connected to each other, the fixed finger having a supported end supported by the fixed column and a suspended end which is unsupported; and a movable structure including a proof mass and an extending mass connected to each other by an extending finger.

In the above-mentioned in-plane sensors, preferably, the continuous length of the proof mass in any of x and y directions is less than a predetermined upper limit, e.g., 60 μm-100 μm.

Also preferably, the movable structure in the above-mentioned in-plane sensors further includes a spring which has at least a curve in its longer dimension.

From yet another aspect of the present invention, a method for making an in-plane sensor is provided, the in-plane sensor comprising a fixed structure including a fixed finger and a fixed column connected to each other, and a movable structure including at least one proof mass and an extending finger connected to each other, the method comprising: providing a substrate on which at least a contact layer and at least a metal layer have been deposited to form the fixed column of the fixed structure, the fixed column being surrounded by a first material region; depositing and defining at least a metal layer and a via layer to form the fixed finger of the fixed structure and the proof mass and the extending finger of the movable structure, the fixed finger of the fixed structure, and the proof mass and the extending finger of the movable structure are surrounded by a second material region; and removing the first and second material regions.

In the above-mentioned method, the first and second material regions can be removed in one step or in two or more steps.

Preferably, the step of removing the first and second material regions includes: depositing a protection layer; depositing a hard mask; patterning the protection layer and the hard mask; and etching the first and second material regions. More preferably, after patterning the protection layer and the hard mask, a mask is deposited.

From yet another aspect of the present invention, an in-plane sensor comprises a structure unit which includes: a fixed structure including a fixed finger and a fixed column connected to each other, the fixed finger having a supported end supported by the fixed column and a suspended end; and a movable structure including at least one proof mass which surrounds the fixed finger in a horizontal plane.

Preferably, the proof mass includes openings.

From yet another aspect of the present invention, an out-of-plane sensor comprises a structure unit which includes: a fixed structure including an upper fixed part and a lower fixed part; and a movable structure including a movable part between the upper fixed part and the lower fixed part, wherein at least one of the upper fixed part, the lower fixed part and the movable part includes an opening.

It is to be understood that both the foregoing general description and the following detailed description are provided as examples, for illustration and not for limiting the scope of the invention.

BRIEF DESCRIPTION OF THE DRAWINGS

These and other features, aspects, and advantages of the present invention will become better understood with regard to the following description, appended claims, and accompanying drawings where:

FIGS. 7A-7H show a process embodiment according to the present invention, wherein FIGS. 7A, 7C and 7E-7G are cross-sectional views taken along the A-A section line of FIG. 3, and FIGS. 7B, 7D and 7H are cross-sectional views taken along the B-B section line of FIG. 3;

DESCRIPTION OF THE PREFERRED EMBODIMENTS

The drawings as referred to throughout the description of the present invention are for illustration only, but not drawn according to actual scale.

Figure 3:
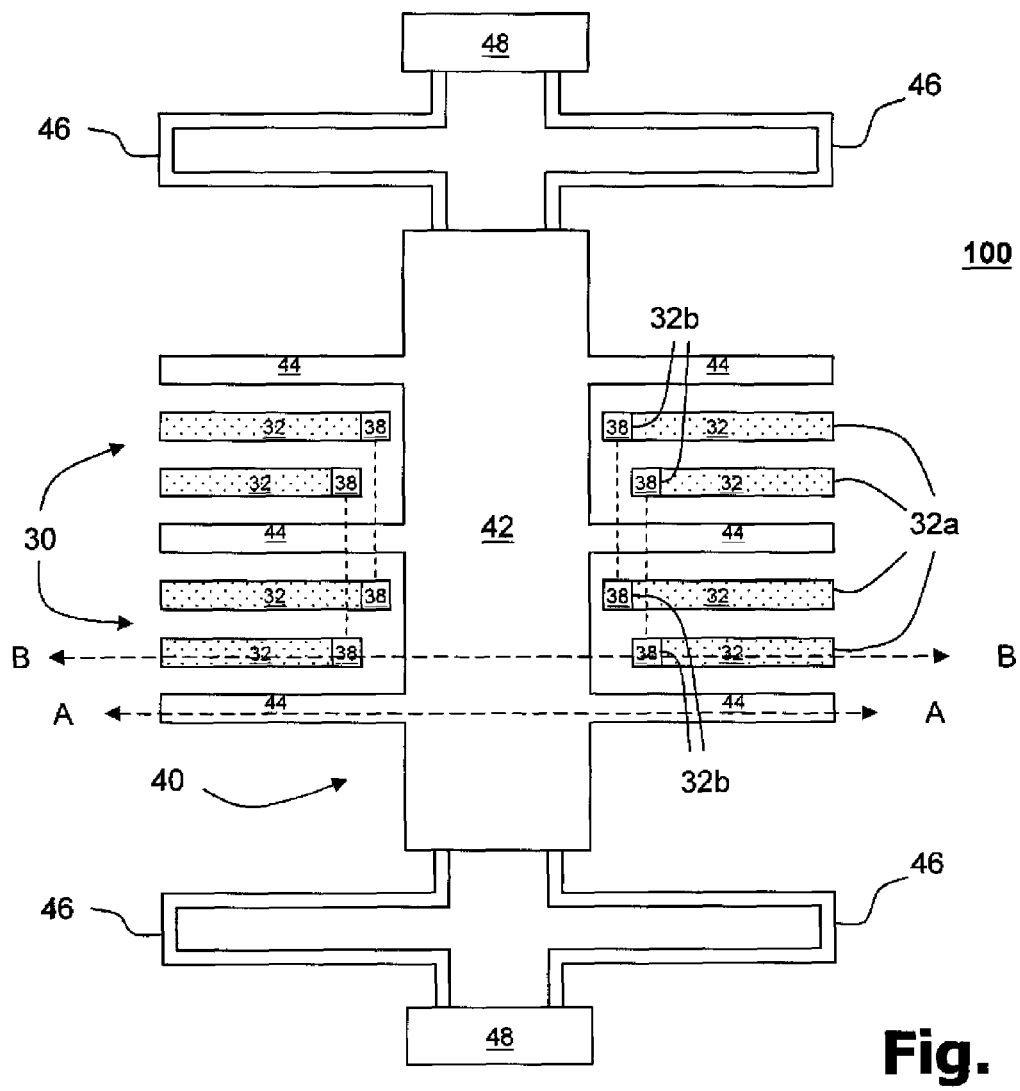
FIG. 3 shows an embodiment of the present invention.
Figure 4:
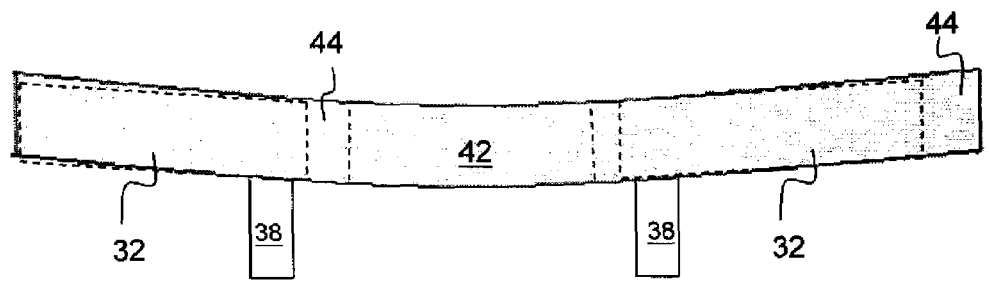
FIG. 4 shows that the drawback in the prior art is overcome by the present invention.

Referring to FIG. 3, in one embodiment of the present invention, an in-plane sensor has a micro-electro-mechanical structure 100 which includes at least a fixed structure 30 and a movable structure 40. The movable structure 40 includes a proof mass 42, extending fingers 44, connection parts 46 and anchors 68, connected together. The proof mass 42, extending fingers 44 and connection parts 46 are suspended, while the anchors 68 are fixed to an underlying substrate. In one embodiment, the connection parts 46 are springs. The fixed structure 30 includes multiple fixed fingers 32 which are suspended; each fixed finger 32 has a suspended end 32a and a supported end 32b, the latter being fixed to a fixed column 38. The fixed columns 38 are electrically connected with one another by the substrate or overlying interconnection (the electrical connection is shown by the dot lines). One feature of the present invention is that the supported end 32b is closer to the proof mass 42 than the suspended end 32a is; the supported end 32b is at the same side as the proof mass 42, while the suspended end 32a is at the other side. Thus, as shown in FIG. 4, even if the manufacturing process causes wafer bending, since the suspended end 32a of the fixed finger 32 is located at the same side as the outer edge of the extending finger 44, the bending effect on the fixed finger 32 and the extending finger 44 is similar so that they still overlap in a large area, and keep a high capacitance.

Figure 5A:
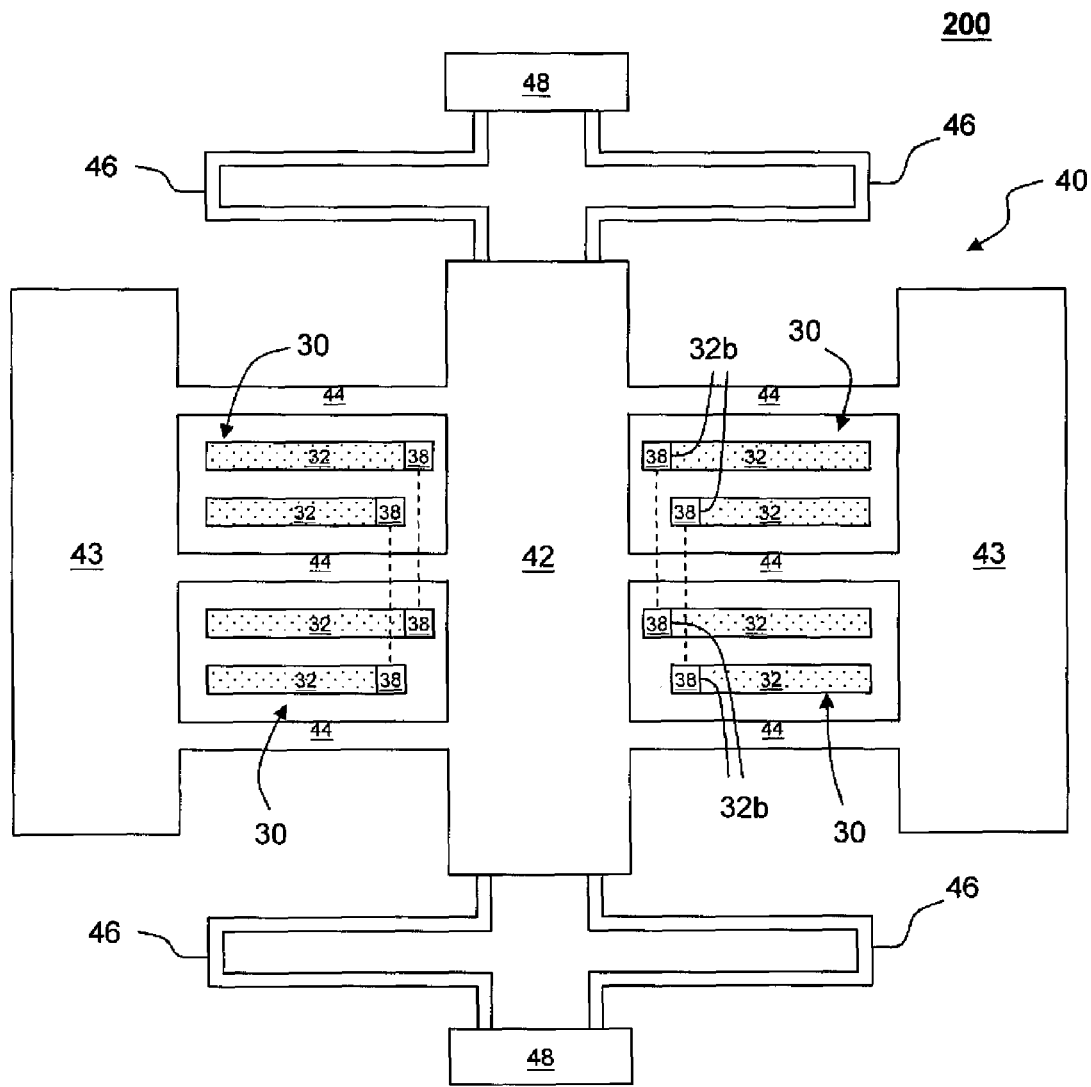
FIGS. 5A and 5B show two embodiments of the present invention.

FIG. 5A shows another embodiment of the present invention. The micro-electro-mechanical structure 200 in this embodiment also includes at least a fixed structure 30 and a movable structure 40. This embodiment is characterized in that, except the proof mass 42, the extending fingers 44, the connection parts 46 and the anchors 48, the movable structure 40 further includes at least one extending mass 43. Due to the extending mass 43, the extending fingers 44 are connected with large masses at their both sides. In this embodiment, the suspended end 32a of the fixed finger 32 may be located at the same side as the proof mass 42 (as shown), or located at the same side as the extending mass 43 (not shown). The rest of the structure is similar to that in the previous embodiment.

Figure 5B:
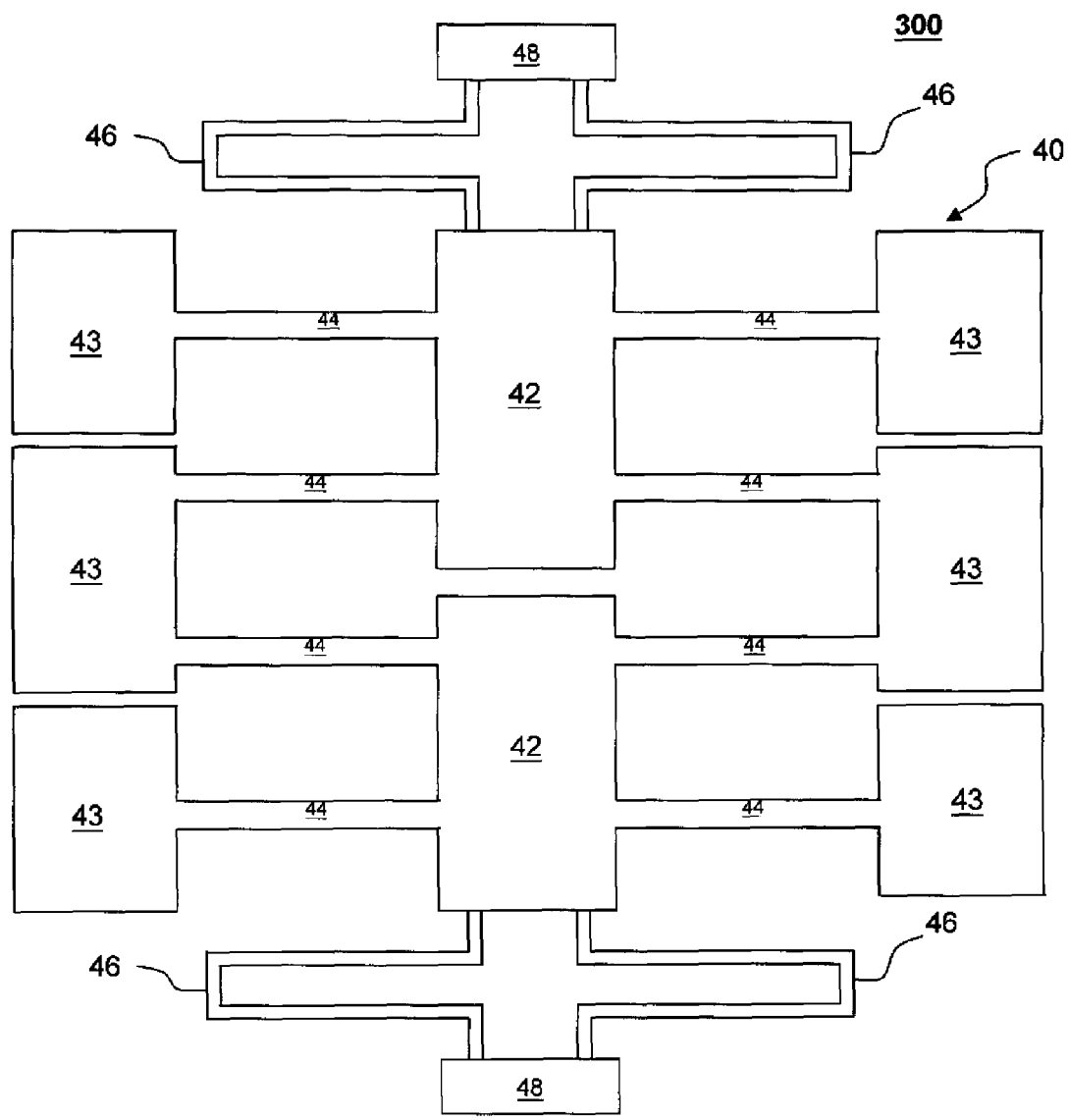

FIG. 5B shows another embodiment of the present invention, in which the fixed structure 30 is omitted. The micro-electro-mechanical structure 300 of this embodiment includes extending masses 43, and furthermore both the proof mass 42 and the extending masses 43 are longitudinally (y-direction in the figure) divided into several segments connected together. The purpose for such division is to reduce the continuous length of the proof mass 42 and the extending masses 43 in the y-direction to reduce bending. The continuous length may be kept under a predetermined length limit such as 60 μm-100 μm.

Figure 6A:
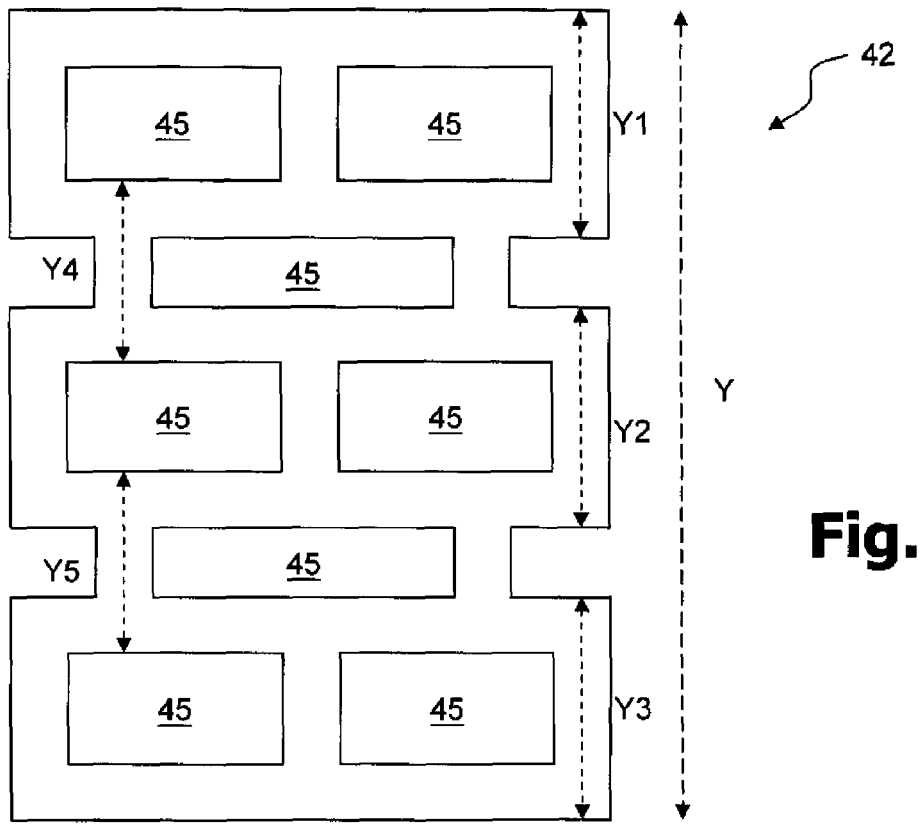
FIGS. 6A-6C show three embodiments of the present invention.
Figure 6B:
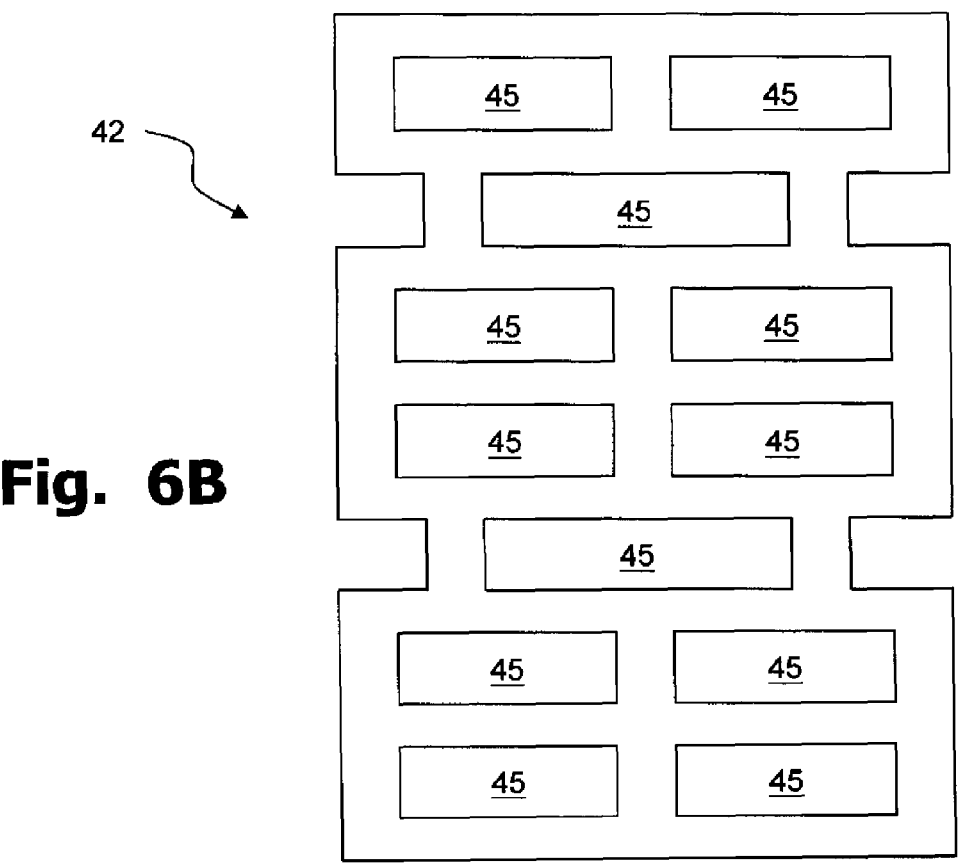

FIG. 6A shows a further embodiment of the present invention in which only the proof mass 42 is shown. In this embodiment, the proof mass 42 includes a plurality of large openings 45. This provides two effects: first, it is easier to etch the material under the proof mass 42; second, the continuous length of the proof mass 42 in either x or y or both directions (only y-direction in this embodiment) will not be too long. The term "continuous length" means a length of a straight, unturned physical connection between two points, which does not cross over any gap or opening. More specifically, as shown in FIG. 6A, the proof mass 42 is divided into several segments Y1, Y2. . . in its y-direction, and each segment has a longitudinal length under a predetermined limit such as 60μm-100μm. Thus, in this embodiment, the continuous length of the proof mass 42 in y-direction is limited within 60μm-100μm. The purpose for this arrangement is to reduce bending; because the continuous length in a direction is limited, the bending situation in that direction can be reduced. There are numerous ways to arrange the locations, sizes, etc. of the openings in addition to that shown in FIG. 6A; FIG. 6B shows another example. In the embodiments shown in FIGS. 6A and 6B, only the continuous length in y-direction is limited, but the same arrangement can be applied to the x-direction or any other direction. Moreover, the openings can be arranged also on the extending masses 43.

Figure 6C:
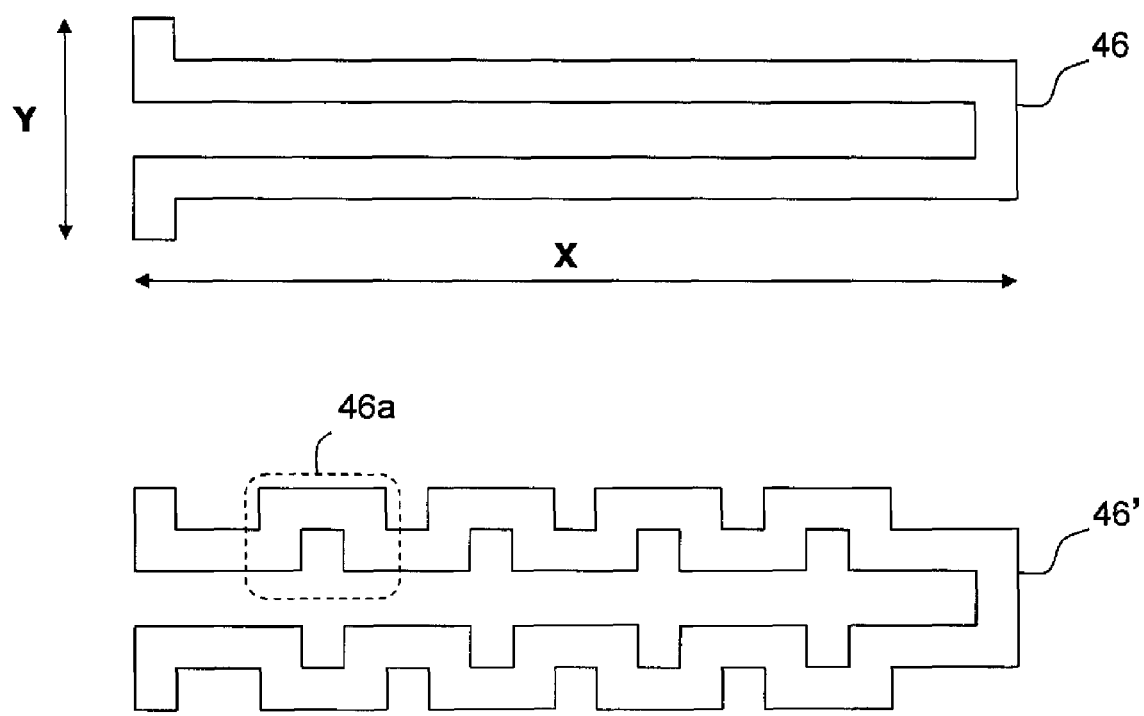

The structure of the spring 46 is not limited to that shown in the embodiments of FIGS. 3, 5A and 5B. Referring to FIG. 6C which shows a simple spring 46 (only the right side) of FIGS. 3, 5A and 5B in comparison with a relatively more sophisticated spring 46', the spring 46' has at least one curve 46a in its longer dimension (x-direction in this case) to increase its effective length. This reduces the stiffness of the spring and increases the sensitivity of the sensor.

Figure 7A:
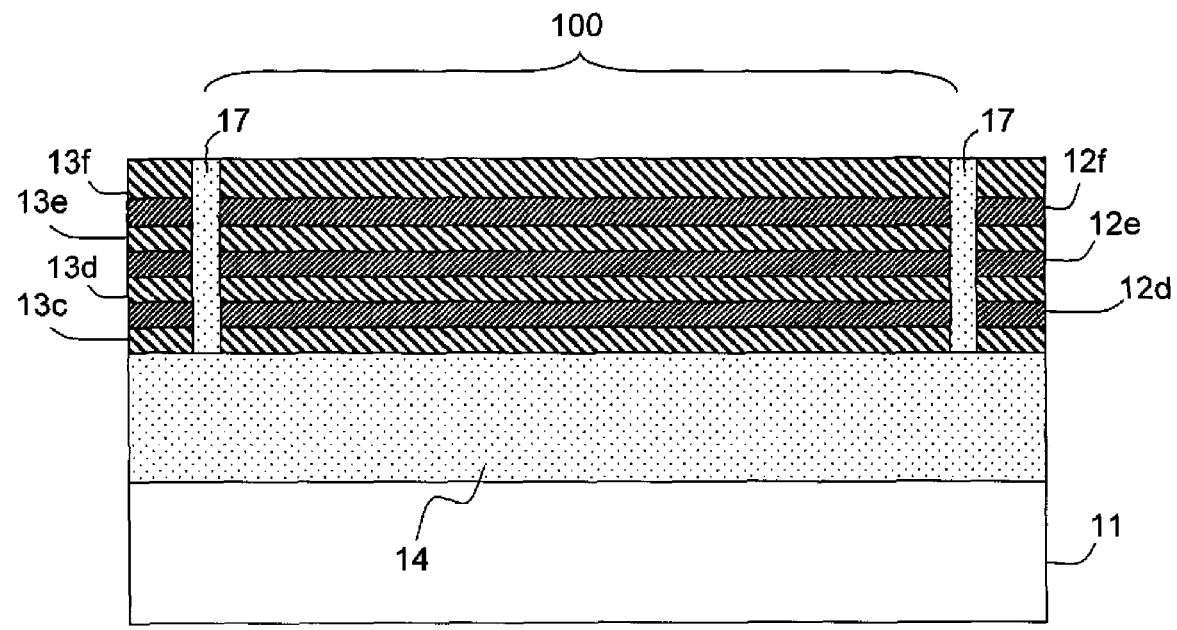
Figure 7B:
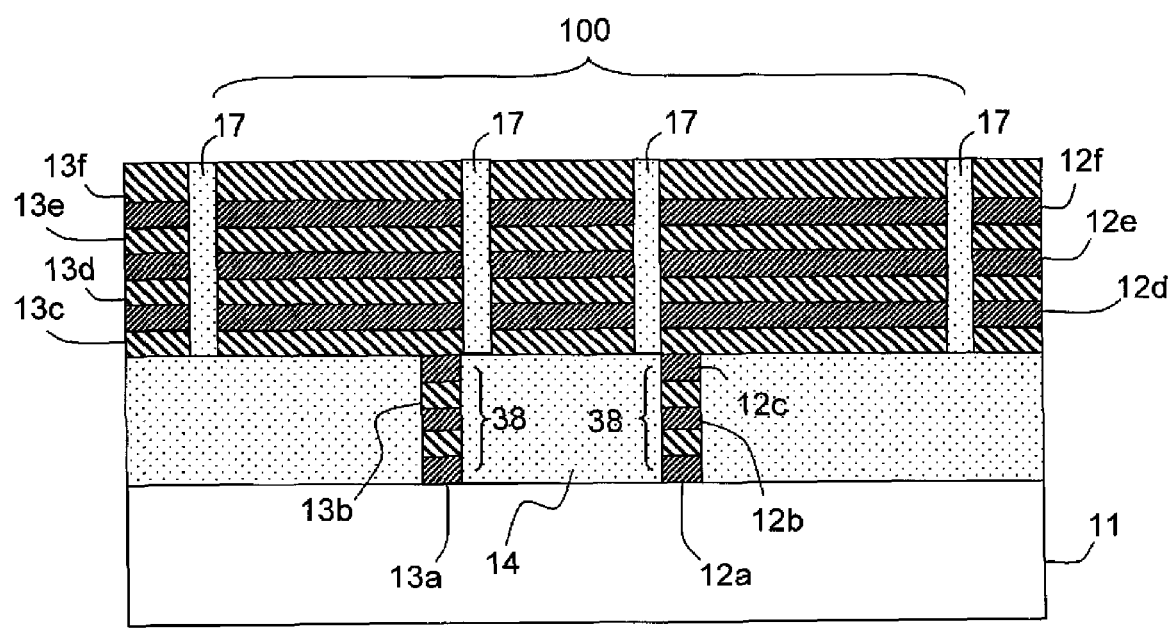

Hereinafter a process embodiment for making the in-plane sensor will be described with reference to FIGS. 7A-7H, taking the structure of FIG. 3 as an example. A six-metal-layer process is shown as an example, but the present invention can certainly be embodied in a process of any other number of metal layers, for making the structures of FIGS. 5A, 5B, 6A, 6B and other structures under the spirit of the present invention. Referring to FIG. 7A which is a cross-sectional view taken along the A-A section of FIG. 3 and FIG. 7B which is a cross-sectional view taken along the B-B section of FIG. 3, in this embodiment, a zero-layer wafer substrate 11 is provided, which for example can be a silicon wafer so that the process is compatible with a standard CMOS process. Next, transistor devices can be formed by standard CMOS process steps as required (not shown), followed by deposition, lithography and etch steps to form interconnection including a contact layer 12a, a first metal layer 13a, a first via layer 12b, a second metal layer 13b, and a second via layer 12c, and concurrently form the fixed column 38 of FIG. 3, as shown in FIG. 7B. The lower structure shown in the figure includes two metal layers in which, for example, the contact layer and the via layers can be made of tungsten with a pre-deposited poly-silicon or nitride layer; the metal layers can be made of aluminum; and the dielectric layer can be made of oxides such as silicon oxide. Other conductive or dielectric materials can be used to replace what are suggested above, and the lower structure can include more or less number of metal layers. The pattern of each of the layers 12a-12c and 13a-13b is thus that an oxide region 14 (the first material region to be etched) is formed. The area outside the micro-electro-mechanical structure 100 is not shown for simplicity of the drawings. The oxide region 14 may be made of silicon oxide, for example. In order that the etching of the oxide region 14 does not damage the other areas in the micro-electro-mechanical device, preferably, the oxide region 14 is encompassed in a guard ring (not shown). The guard ring can be formed concurrently with the patterns of the layers 12a-12c and 13a-13b.

And next, an interconnection structure is formed on the substrate, which includes via layers 12d-12f and metal layers 13c-13f. According to the design of the micro-electro-mechanical device, some areas have to be isolated from one another; in this embodiment, they are isolated from one another by an oxide region 17. The oxide region 17 can be formed concurrently with the patterns of the via layers 12d-12f and metal layers 13c-13f.

Figure 7C:
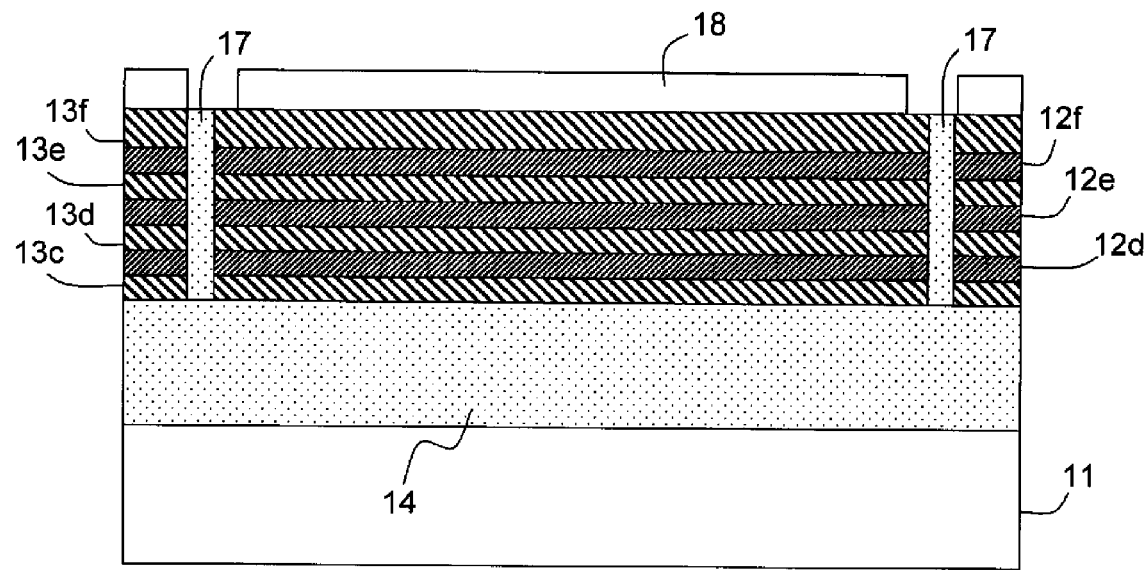
Figure 7D:
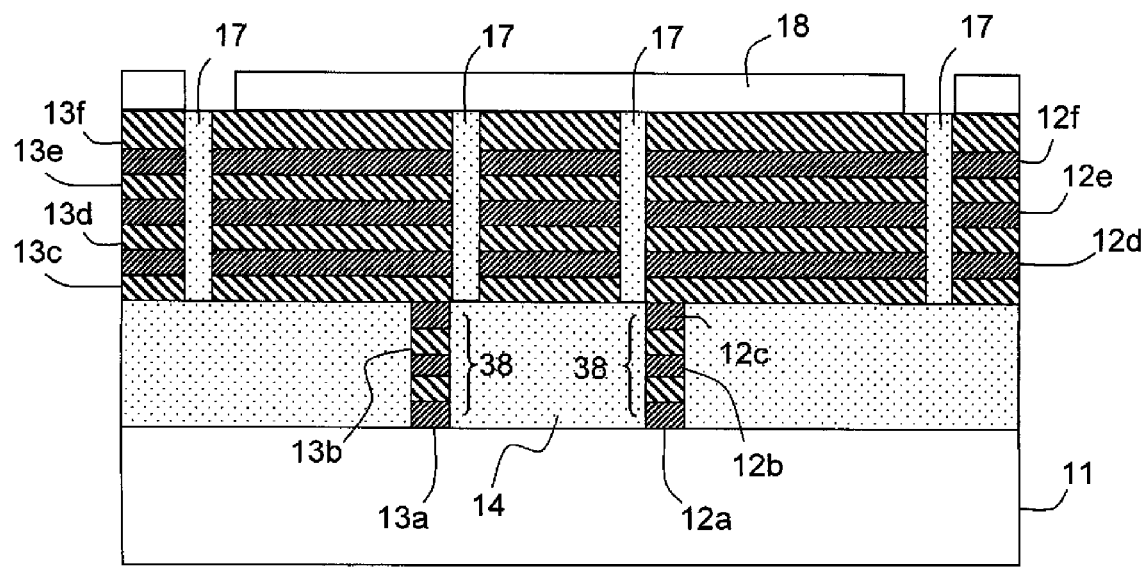

Referring to FIGS. 7C and 7D which follow FIGS. 7A and 7B, in one embodiment, a mask 18 is formed and patterned to expose the oxide region 17 (the second material region to be etched). The mask 18 for example can be a photoresist layer patterned by lithography, or other materials such as a metal layer or an amorphous silicon layer. The embodiment using the metal layer or the amorphous silicon layer as the mask will be described later.

Figure 7E:
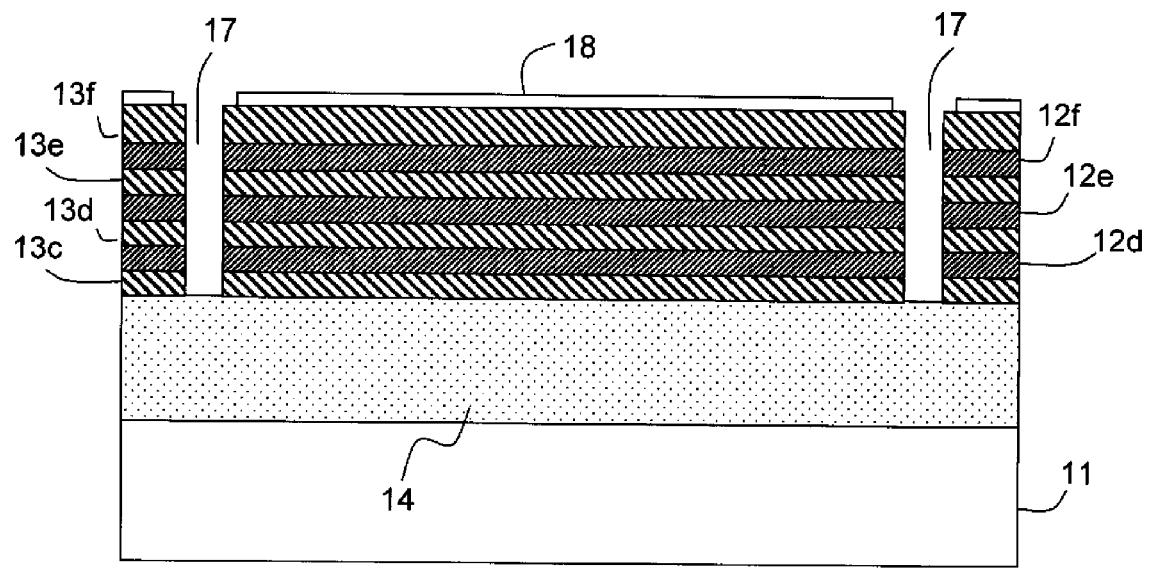

Referring to FIG. 7E which follows FIG. 7C, an oxide etch step is performed according to the pattern of the mask 18, to remove the oxide inside the oxide region 17. The etch for example can be anisotropic RIE (reactive ion etch). The etch step consumes most of the mask 18 in this embodiment.

Note that the steps from FIGS. 7C to 7E are optional and can be omitted; that is, the process can proceed directly after FIGS. 7A and 7B to FIG. 7F.

Figure 7F:
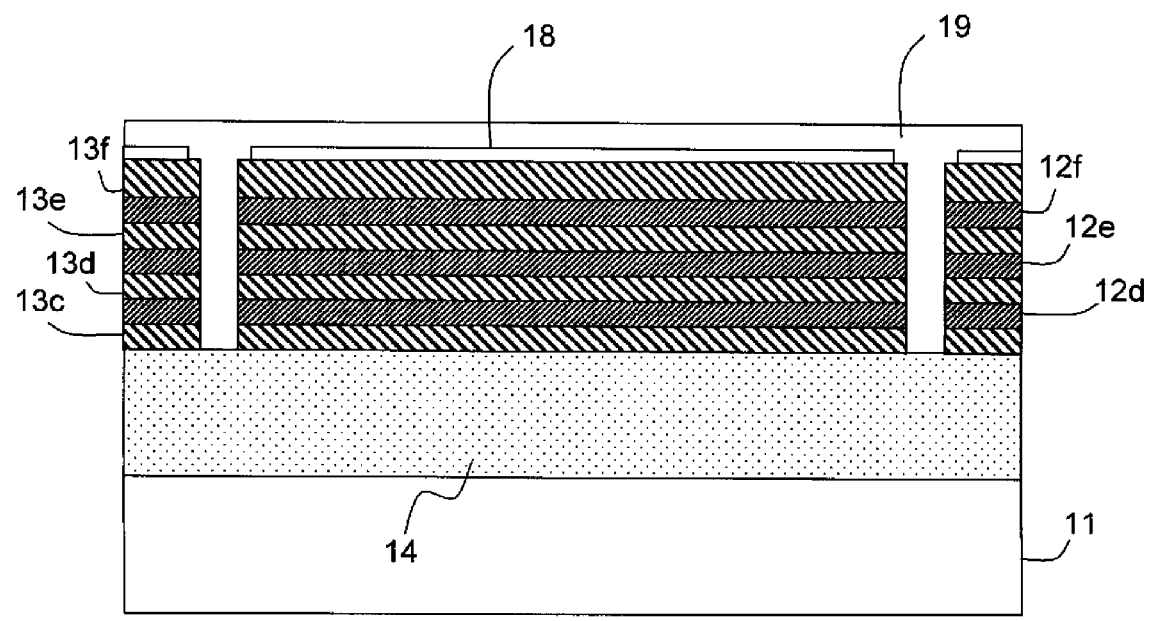

Next referring to FIG. 7F, regardless whether the mask 18 is consumed, a mask 19 is formed which for example is a photoresist layer, and an etch step is performed on the oxide region 14 to remove it. The etch for example can be HF vapor etch, or BOE (buffered oxide etch) by immersing the whole wafer in an acid tank.

Figure 7G:
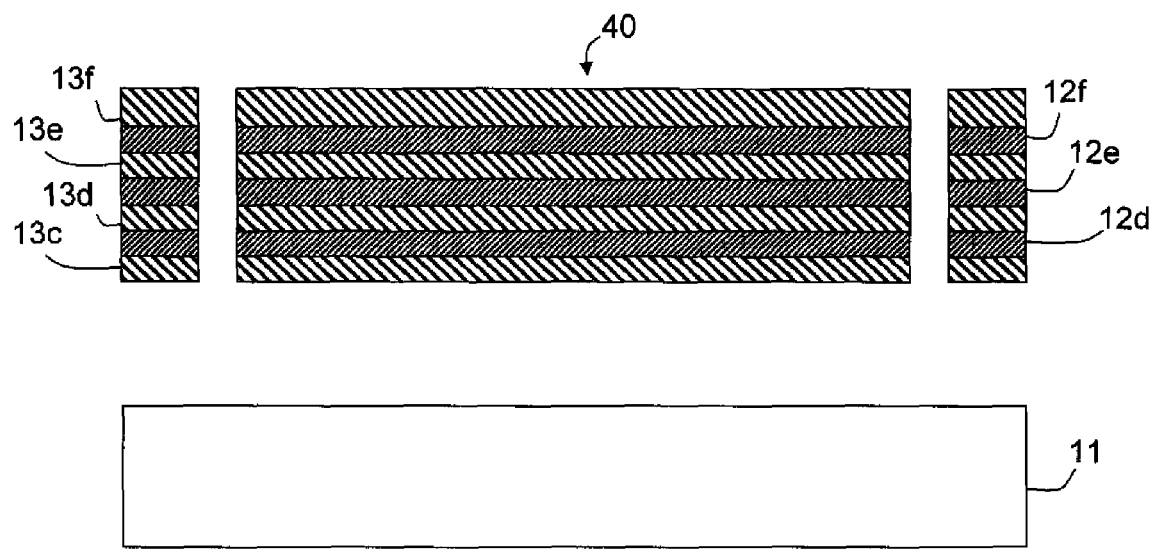
Figure 7H:
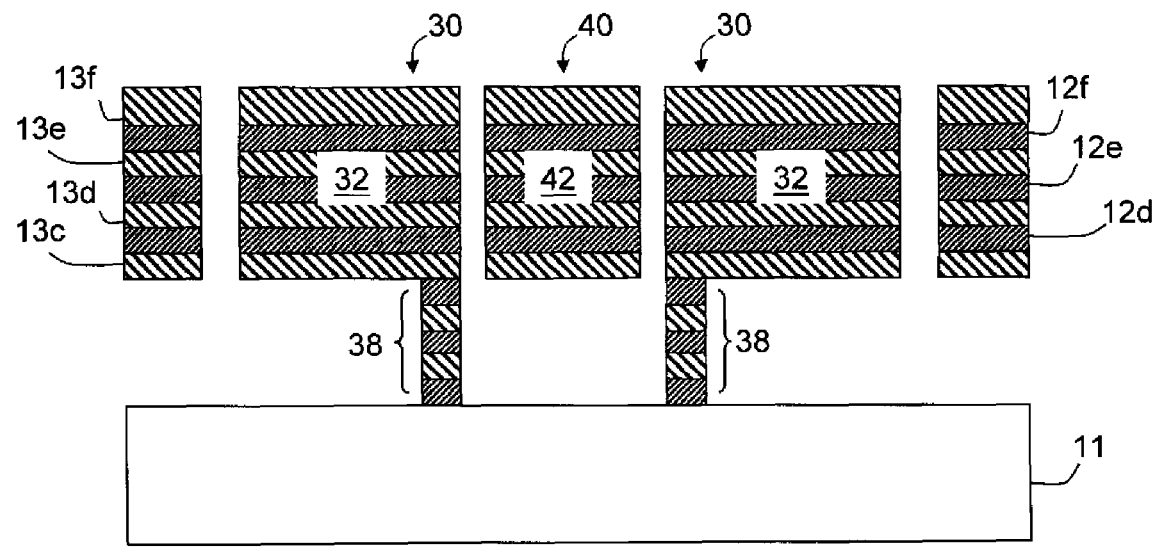

Finally, as shown in FIG. 7G, the photoresist layers 18 and 19 are removed to obtain the desired micro-electro-mechanical device. This cross sectional view only shows the movable structure 40. FIG. 7H is a cross-sectional view taken along the B-B section of FIG. 3, which shows the fixed structure 30 (including the fixed fingers 32 and the fixed columns 38) and a part of the movable structure 40 (the proof mass 42).

Figure 8A:
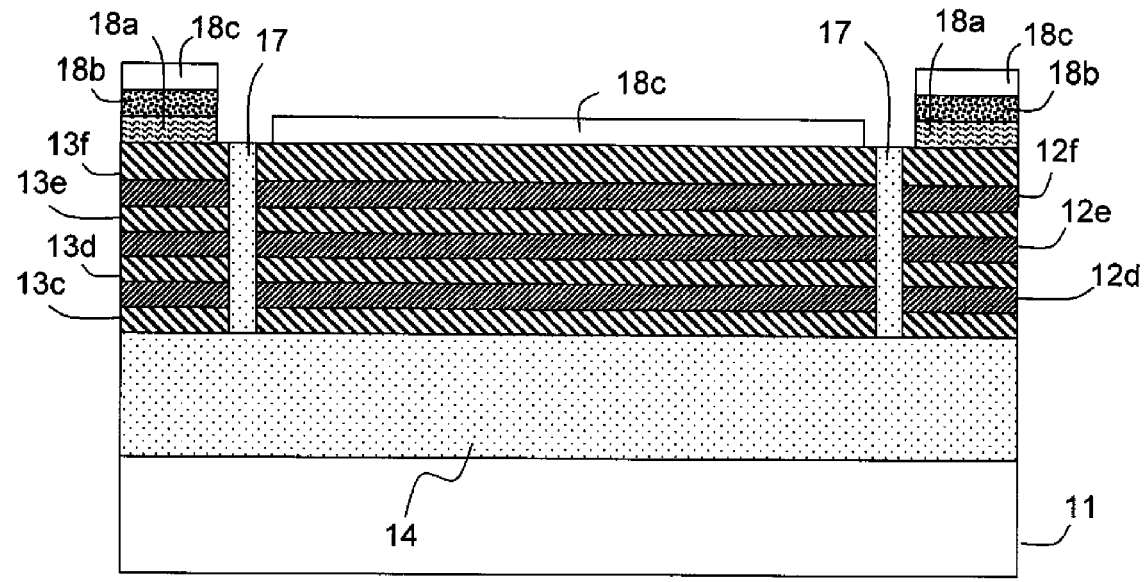
FIGS. 8A-8C and FIGS. 9A-9C show two process embodiments according to the present invention.
Figure 9A:
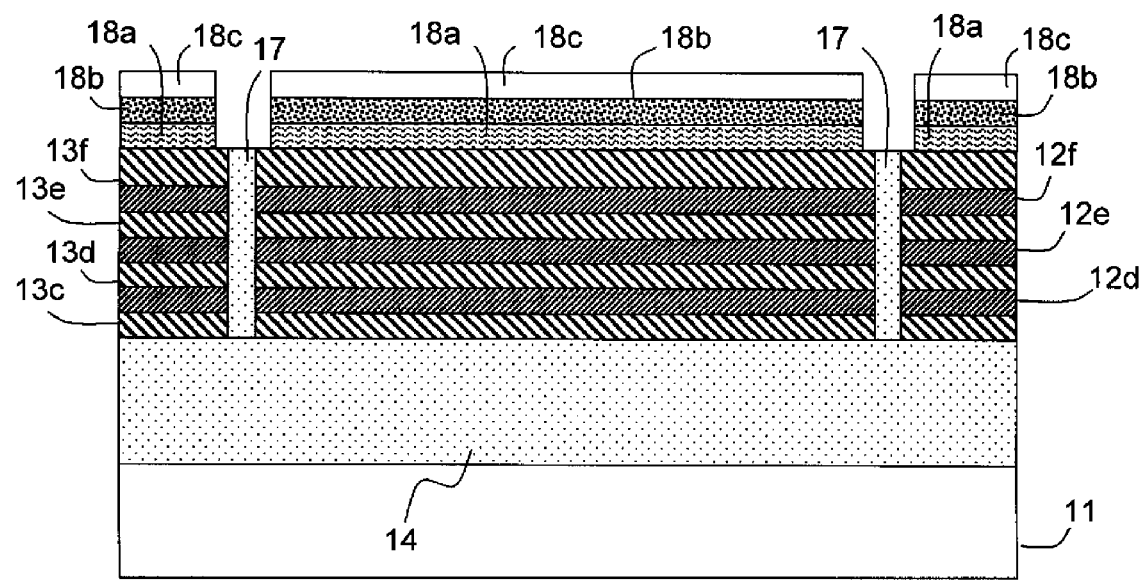

FIG. 8A follows FIG. 7A, which shows an embodiment using the metal layer or the amorphous silicon layer as the mask. In this embodiment, preferably, a protection layer 18a is deposited on the uppermost metal layer 13f. The protection layer 18a for example can be an oxide layer or a bi-layer structure including an oxide layer and a nitride layer. A hard mask layer 18b is deposited on the protection layer 18a; the hard mask layer 18b for example can be a metal layer or an amorphous silicon layer. In the embodiment shown in the figure, the protection layer 18a and the hard mask layer 18b have been patterned to open the micro-electro-mechanical structure 100. Because a hard mask layer 18b is provided, the photoresist layer 18c in the figure is not necessarily required and can be omitted. In this embodiment, two patterning steps are required (to pattern the protection layer 18a and the hard mask layer 18b, and to pattern the photoresist layer 18c). However this is not the only way to embody the present invention; the layers can be patterned by one step, as shown in FIG. 9A.

Figure 8B:
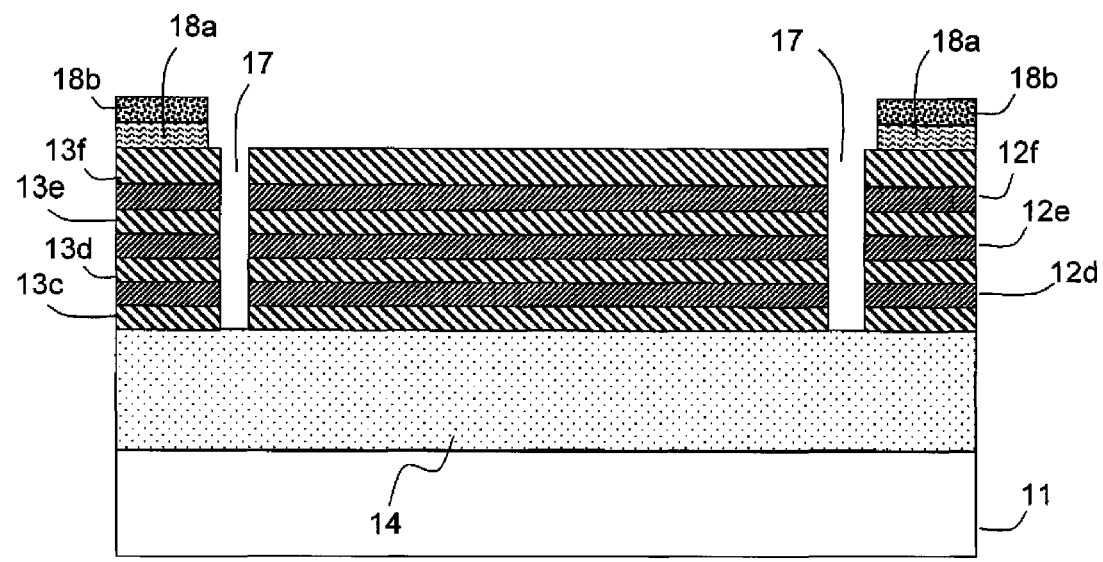
Figure 9B:
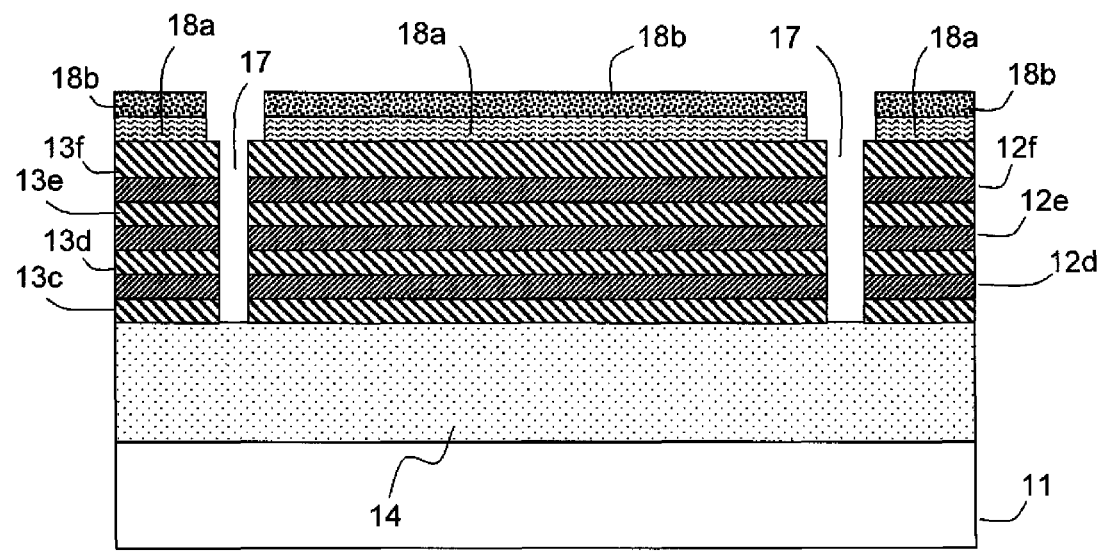

Next, referring to FIGS. 8B and 9B, an oxide etch step is performed to remove the oxide inside the oxide region 17. The etch for example can be anisotropic RIE (reactive ion etch). The etch step consumes most of the photoresist layer 18c, but the hardmask 18b still exist. Likely, this etch step is optional and can be omitted; the process can proceed directly to FIGS. 8C and 9C.

Figure 8C:
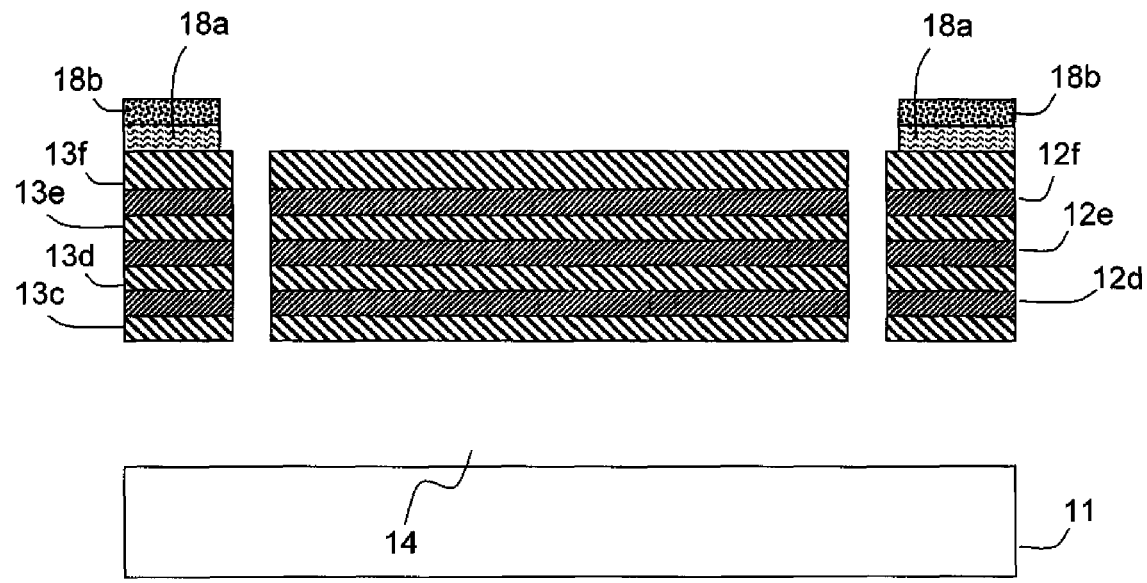
Figure 9C:
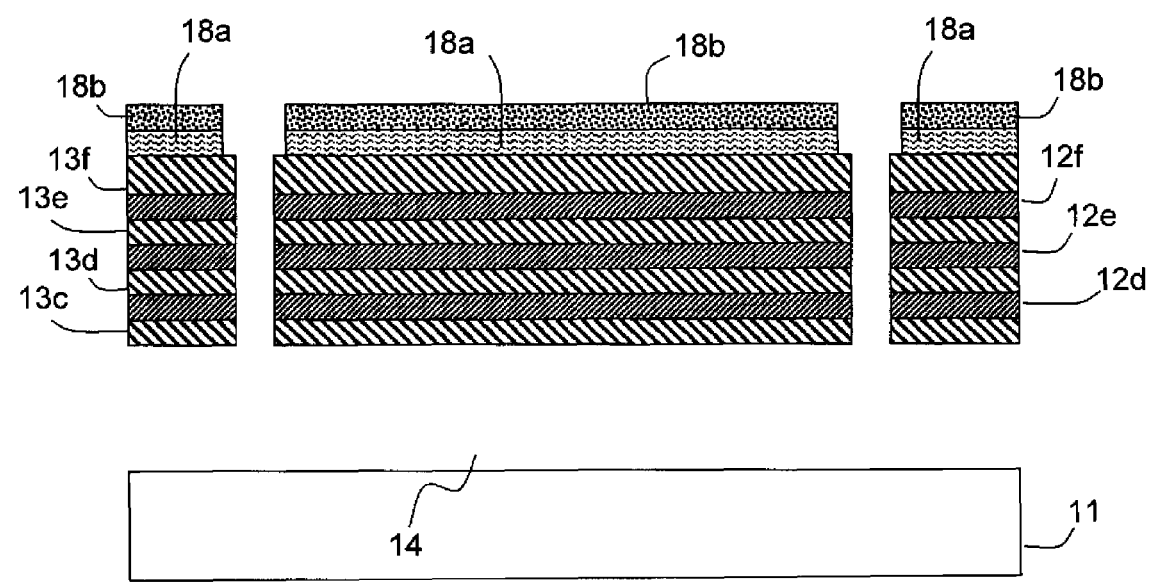

Next, referring to FIGS. 8C and 9C, an oxide etch step is performed on the oxide region 14 to remove it. The etch for example can be HF vapor etch, or BOE (buffered oxide etch) by immersing the whole wafer in an acid tank. Thus, the desired micro-electro-mechanical device is obtained. The difference between FIGS. 8C and 9C is in that there are the protection layer 18a and the hard mask layer 18b residual on the micro-electro-mechanical structure area 100 in FIG. 9C. These layers, together with the hard mask 18b outside the area 100, can be removed by an etch process if necessary.

The above process can be applied to making the structures shown in FIGS. 5A, 5B, 6A and 6B, and the structure shown in FIGS. 10-15.

Figure 1:
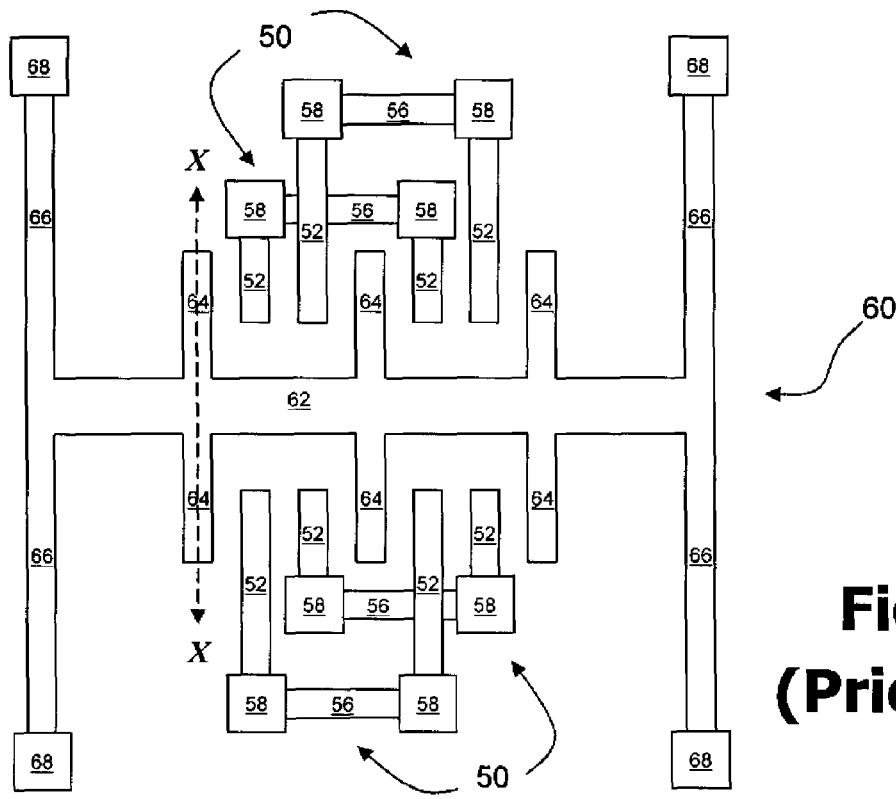
FIG. 1 shows a conventional in-plane sensor.
Figure 2:
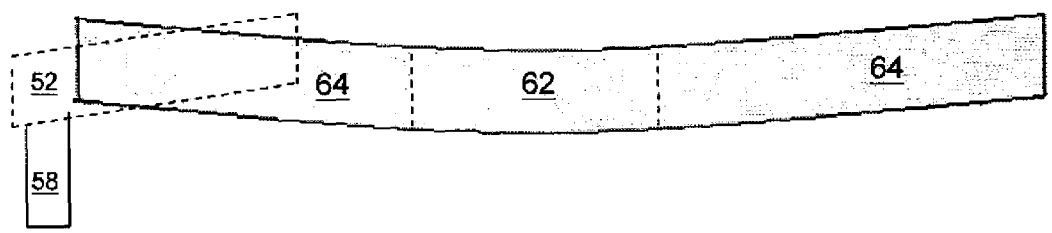
FIG. 2 shows the drawback in the prior art.
Figure 10:
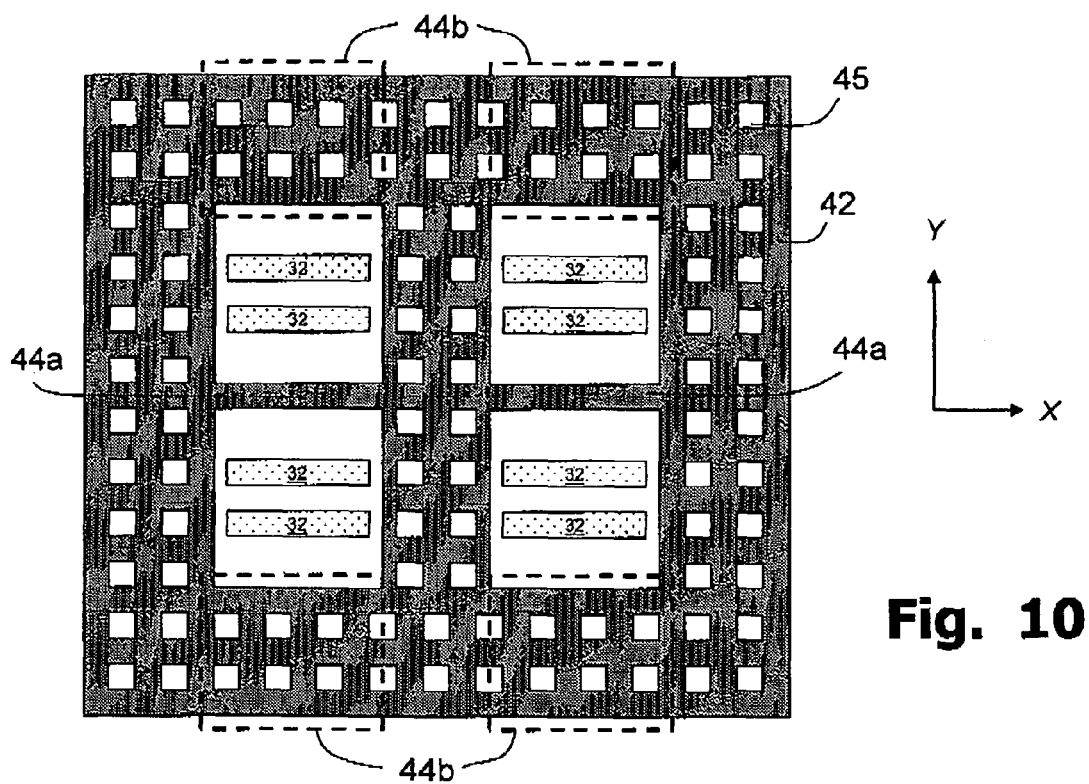
FIG. 10 shows a further embodiment of the present invention.

FIG. 10 shows another embodiment according to the present invention. In this embodiment, the proof mass 42 forms a surrounding structure encompassing the fixed fingers 32 in a horizontal plane (the x, y plane). The movement of the proof mass 42 causes changes of the capacitances between the proof mass 42 and the segments 44a and 44b. Again, there is no bending problem as that shown in FIG. 2 even if the segment 44-44a is thin, because the proof mass 42 holds two sides of the segment 44a. The segments 44a and 44b correspond to the extending fingers 44 in the previous embodiments, but they are not necessarily as thin as the extending fingers 44 in the previous embodiments. Preferably but not necessarily, the proof mass 42 includes openings 45 for the reasons explained above. If the segment 44a is thicker than that shown in the figure, for example as thick as the segment 44b, it can be provided with openings 45 as well. Shown in FIG. 10 are small square openings 45, but their size and shape can be modified to any size and shape.

Figure 11:
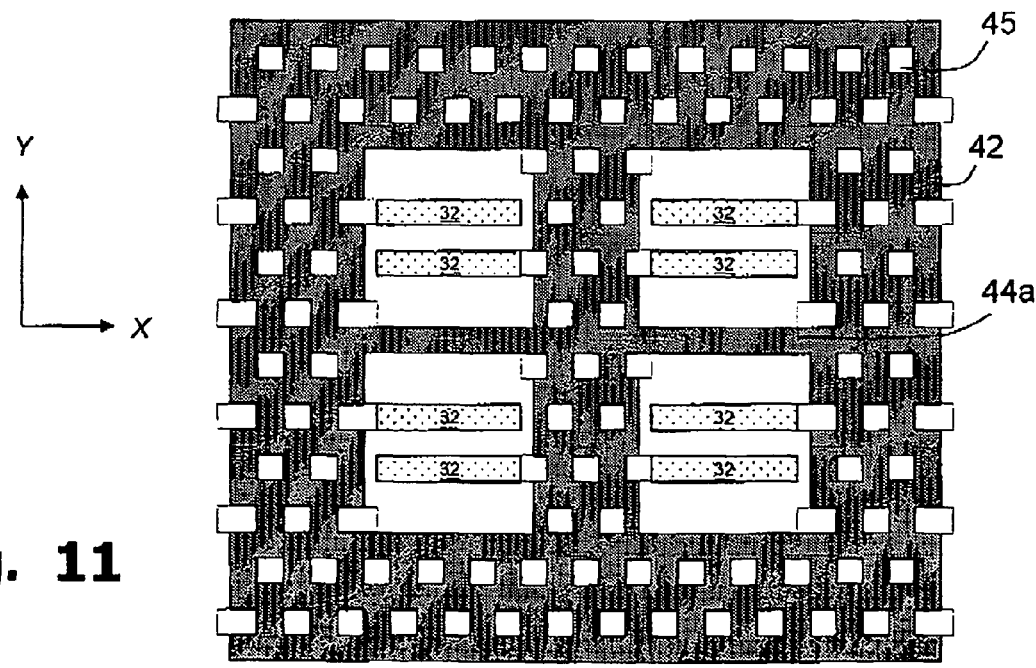
FIG. 11 shows another embodiment of the present invention which is similar to the embodiment of FIG. 10 but the length in y-direction is limited.

FIG. 11 shows another embodiment of the present invention wherein the continuous length of the proof mass 42 in y-direction is limited.

Figure 12:
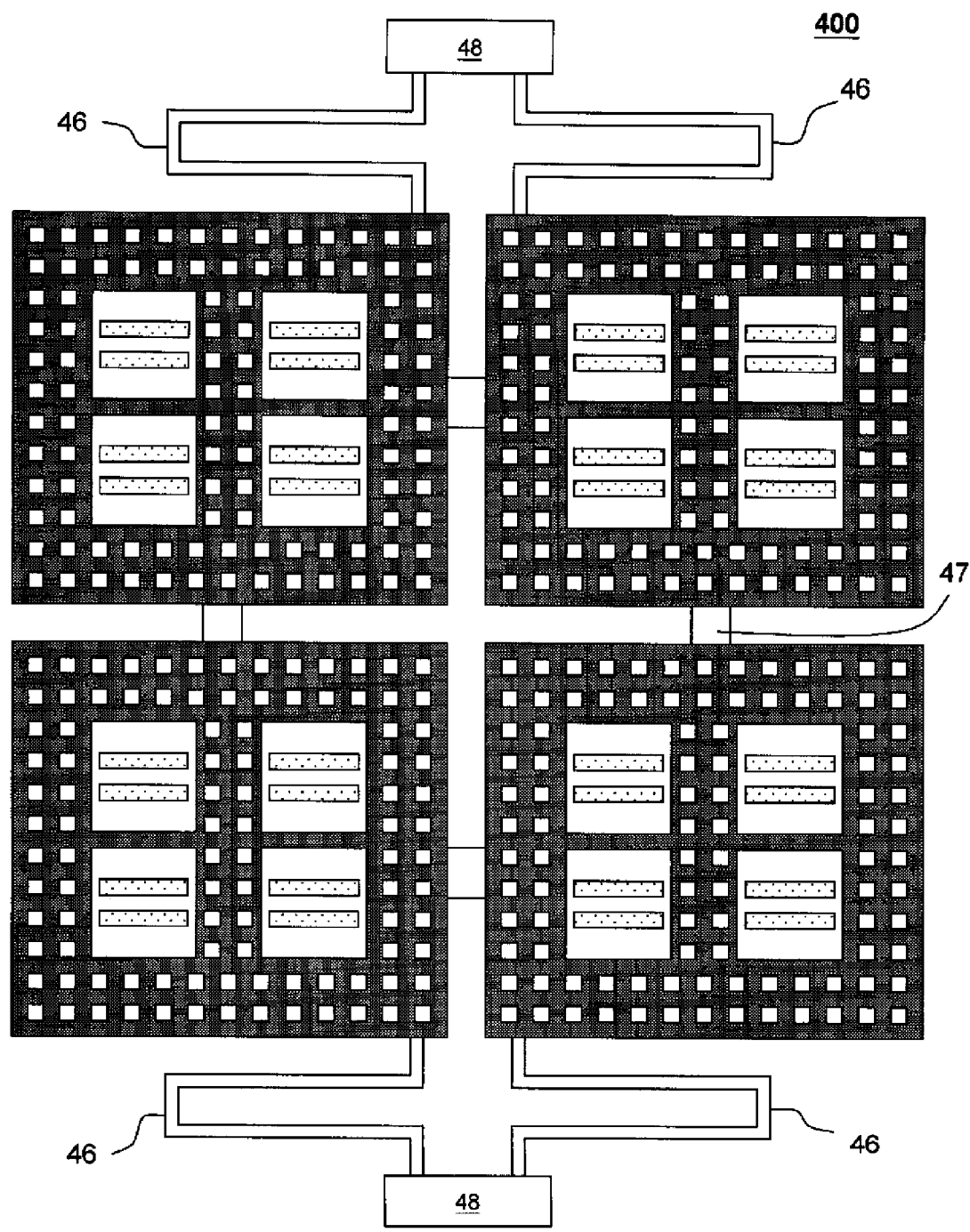
FIG. 12 shows an example of an in-plane sensor formed by the embodiment of FIG. 10.

FIG. 12 shows an in-plane sensor 400 formed by the structure shown in FIG. 10. More than one unit of the structure of FIG. 10 may be connected together. In this embodiment, four units of the structure of FIG. 10 are connected together through connecting parts 47. Note that the connecting parts 47 can be of any shape and any number as long as the required number of structure units of FIG. 10 can be connected together; what is illustrated in FIG. 12 is only an example. The springs 46 and the anchors 48 function in the same way as that in FIGS. 3, 5A and 5B. Similarly, more than one unit of the structure of FIG. 11 may be connected together.

The idea of the present invention can be similarly applied to out-of-plane sensors. FIG. 13D shows an out-of-plane sensor unit wherein a movable part 70 vibrates between an upper fixed part 81 and a lower fixed part 82. The lower fixed part 82 for example is located on the substrate 11. The movement or vibration of the movable part 70 causes changes of the capacitances between the movable part 70 and the fixed parts 81 and 82. The top view of FIG. 13D (from the direction E) is shown as FIG. 13E.

Figure 13A:
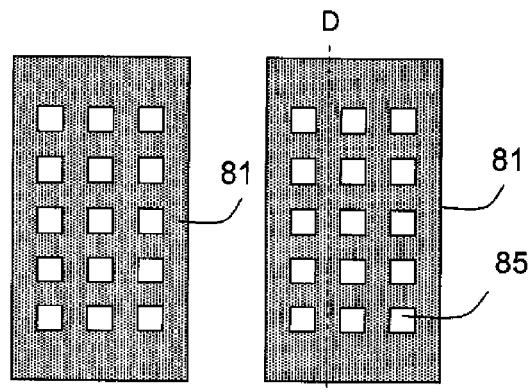
FIGS. 13A-13C show separate levels of an out-of-plane sensor according to the present invention, respectively.
Figure 13B:
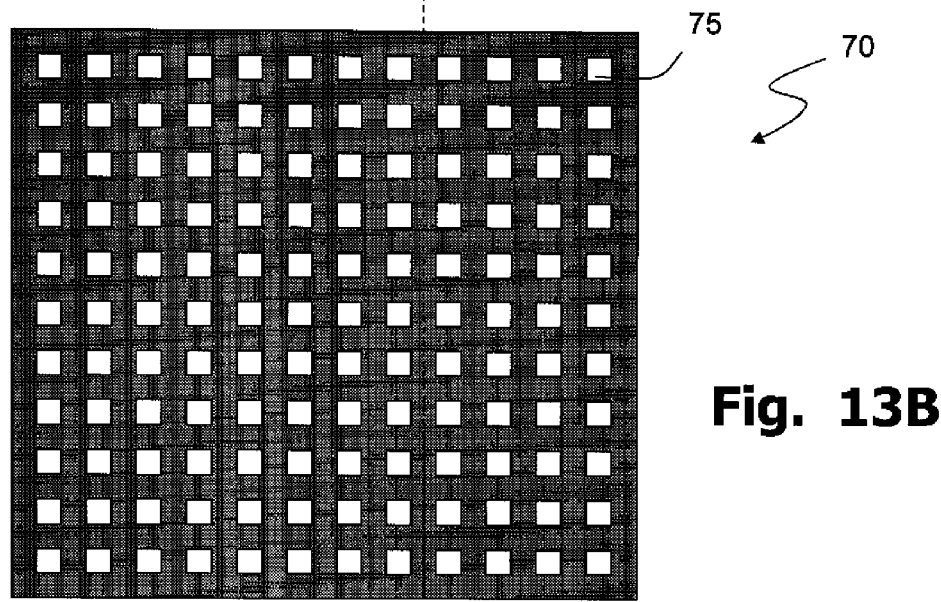
Figure 13C:
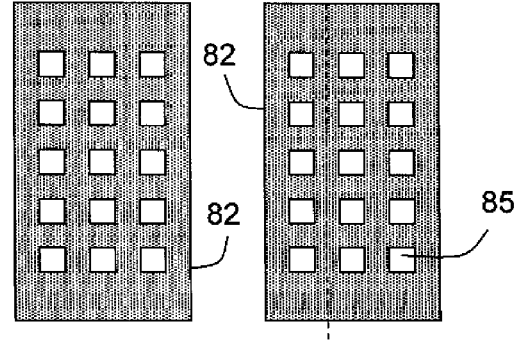
Figure 13D:
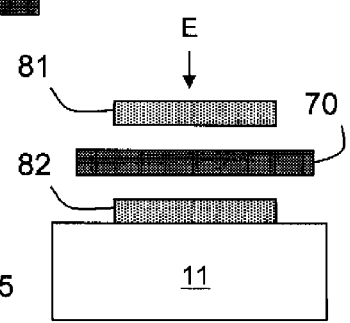
FIG. 13D shows a cross-sectional view taken along the D-D section line of FIGS. 13A-13C.

FIGS. 13A-13C show separate levels of the out-of-plane sensor. FIG. 13A shows an example of the structure of the upper fixed part 81; FIG. 13B shows an example of the structure of the movable part 70; FIG. 13C shows an example of the structure of the lower fixed part 82. The line D-D is the sectional line that the cross-sectional view FIG. 13D is taken from. As shown in these figures, the movable part 70 includes openings 75, and the upper and lower fixed parts 81 and 82 includes openings 85. The openings 75 and 85 are shown to be small square openings, but their size and shape can be modified to any size and shape.

The out-of-plane sensor described above includes a "differential capacitor" structure that movable part 70 vibrates between an upper fixed part 81 and a lower fixed part 82; however, the present invention is not limited to such structure. The out-of-plane sensor can only include a "single capacitor" structure, in which one of the upper and lower fixed parts 81 and 82 can be omitted.

Figure 13E:
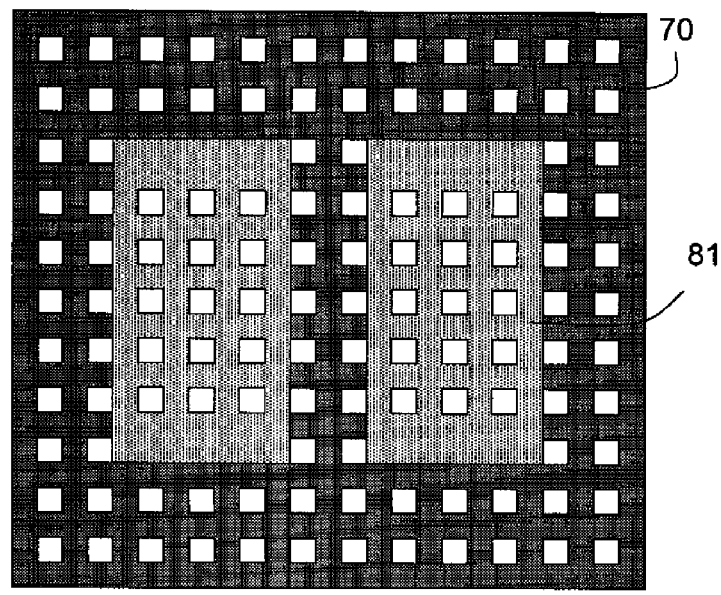
FIG. 13E is a top view from the direction E of FIG. 13D.
Figure 14:
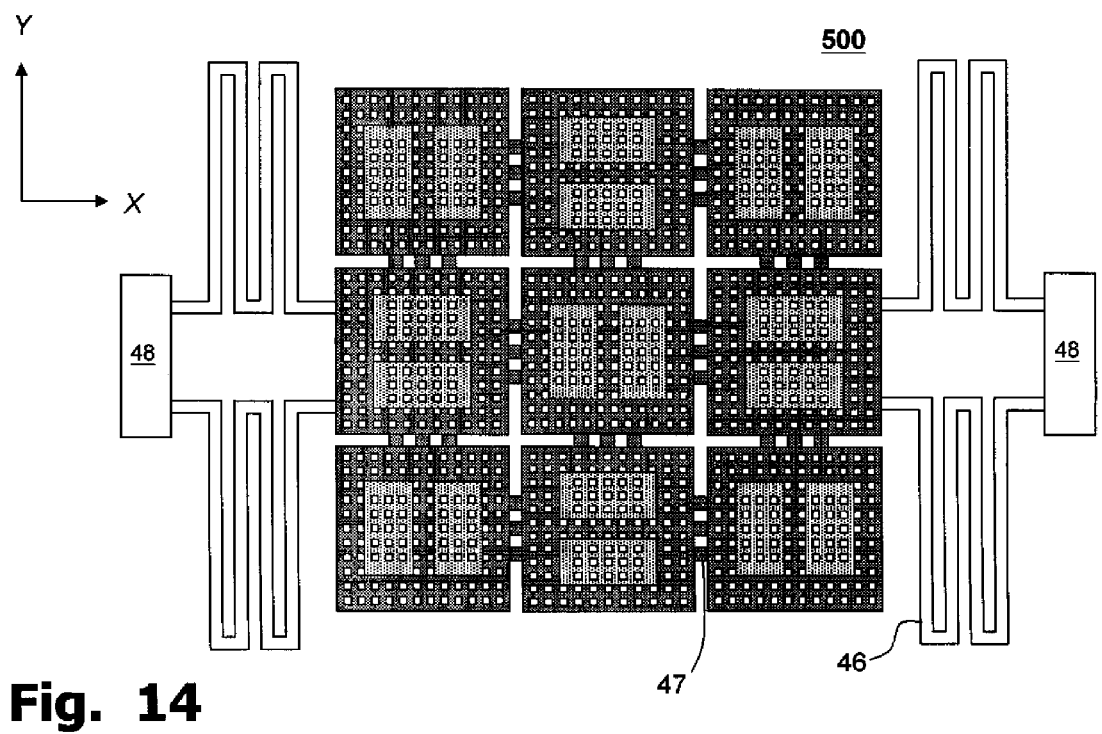
FIG. 14 shows an example of an out-of-plane sensor formed by the embodiment of FIG. 13E.

FIG. 14 shows an out-of-plane sensor 500 formed by more than one structure unit of FIG. 13E. In this embodiment, nine structure units of FIG. 13E are connected together through multiple connecting parts 47. Note that the connecting parts 47 can be of any shape and any number as long as the required number of structure units of FIG. 13E can be connected together; what is illustrated in FIG. 14 is only an example. The movable parts 70 are connected to the springs 46, so that they can vibrate in a vertical direction to cause changes of the capacitances between the movable parts 70 and the fixed parts 81 and 82. The springs 46 are connected to the anchors 48. Note that there may be more than one curve provided in the springs.

Figure 15:
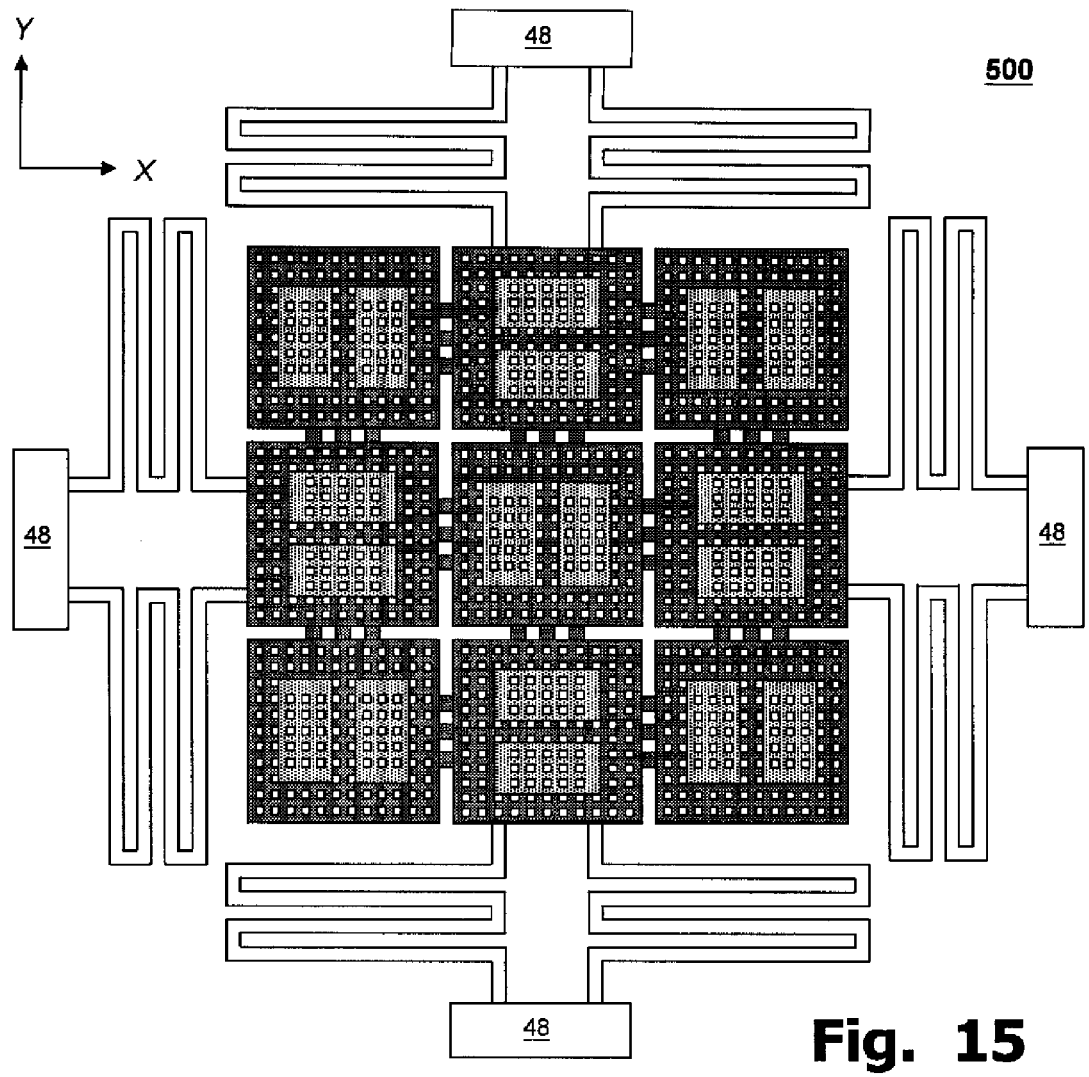
FIG. 15 shows another example of an out-of-plane sensor formed by the embodiment of FIG. 13E.

FIG. 15 shows another example of the out-of-plane sensor 500 which includes springs 46 and anchors 48 located in both x and y directions, that is, at four sides of the structure units of FIG. 13E instead of two.

Figure 16:
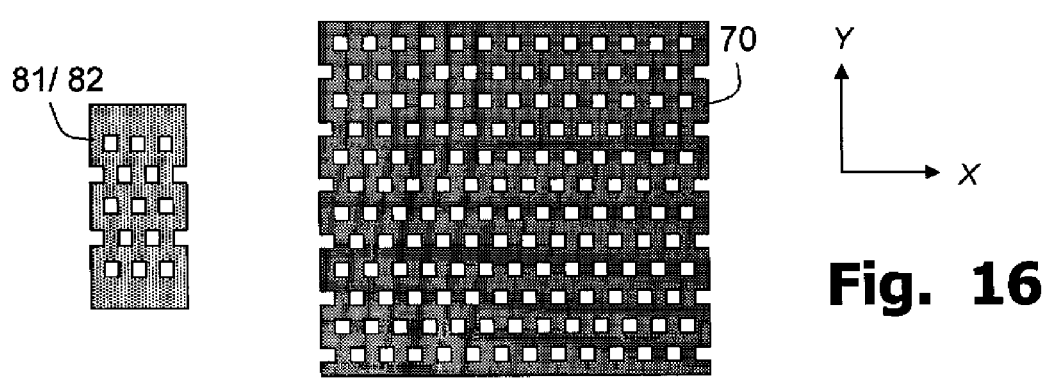
FIG. 16 shows another embodiment of the present invention which is similar to the embodiment of FIGS. 13A-13E but the length in y-direction is limited.

FIG. 16 shows that, similar to FIGS. 6A, 6B and 11, the continuous length of the proof mass 42 in one or both horizontal directions can be limited.

Although the present invention has been described in detail with reference to certain preferred embodiments thereof, the description is for illustrative purpose and not for limiting the scope of the invention. For example, the openings in FIGS. 6A and 6B can be arranged in many other ways. The spring can be of any structure other than those shown in FIG. 6C. The metal layer can be made of copper instead of aluminum, and the dielectric layer can be made of a low dielectric constant material instead of silicon oxide. One skilled in this art can readily think of other modifications and variations in light of the teaching by the present invention. In view of the foregoing, it is intended that the present invention cover all such modifications and variations, which should interpreted to fall within the scope of the following claims and their equivalents.

What is claimed is:

1. An in-plane sensor, comprising:
   a fixed structure including a fixed finger and a fixed column connected to each other, the fixed finger having a supported end supported by the fixed column and a suspended end;
   a movable structure including at least one proof mass which surrounds the fixed finger in a horizontal plane;
   an anchor; and
   a spring connecting an outer side of the proof mass to the anchor,
   wherein by surrounding the fixed finger the proof mass forms an opening, and in additional to the opening surrounding the fixed finger, the proof mass has at least another opening or semi-opening for reducing a continuous length of the proof mass to reduce bending, wherein the at least another opening does not surround the fixed finger, any other fixed finger, the spring, and any other spring.

2. The in-plane sensor of claim 1, comprising two or more movable structures separated from one another and connected together by one or more connecting parts.

3. The in-plane sensor of claim 2, wherein the two or more movable structures have substantially the same size and layout from top view.

4. The in-plane sensor of claim 2, wherein each of the movable structures has the same layout as compared with another movable structure, but is 0°, 90°, 180°, or 270° rotated.

5. The in-plane sensor of claim 2, wherein each of the connecting parts is not a side of any opening surrounding the fixed finger or any other fixed finger.

6. The in-plane sensor of claim 1, wherein the proof mass has a plurality of openings which do not surround the fixed finger and any other fixed finger, and these openings are distributed uniformly in the proof mass.

7. The in-plane sensor of claim 1, wherein the horizontal plane has an x dimension and a y dimension perpendicular to each other, and wherein the continuous length of the proof mass is limited under 100 μm in at least one direction along the x or y dimension.

8. The in-plane sensor of claim 1, wherein the proof mass has at least one semi-opening at a periphery side of the proof mass to reduce a continuous length of the periphery side of the proof mass.

9. An out-of-plane sensor, comprising:
   a fixed structure including at least one fixed part; and
   a plurality of movable structures each including a movable part above or below the fixed part, the movable structures being separated from one another and connected together by one or more connecting parts, wherein each of the connecting part is not a side of any opening surrounding a part of the fixed structure,
   wherein at least one of the fixed part or at least one of the movable parts includes a plurality of uniformly distributed openings for reducing a continuous length of the fixed part or the movable part to reduce bending, and wherein each of the movable structures is movable vertically to vary a distance between the movable structure and the fixed structure.

10. The out-of-plane sensor of claim 9, wherein the fixed structure includes an upper fixed part and a lower fixed part, and wherein the movable parts of the plurality of movable structures are located between the upper and lower fixed parts.

11. The out-of-plane sensor of claim 9, further comprising a spring and an anchor, and wherein the movable parts are connected to the anchor by the spring.

12. The out-of-plane sensor of claim 11, wherein the fixed structure and the plurality of movable structures form one capacitive unit, and the out-of-plane sensor comprises four springs and four anchors located at four sides of the movable structures.

13. The out-of-plane sensor of claim 9, wherein the fixed part and each movable part have a horizontal plane having an x dimension and a y dimension perpendicular to each other, and wherein the continuous length of at least one of the fixed part or at least one of the movable parts is limited under 100 µm in at least one direction along the x or y dimension.

14. The out-of-plane sensor of claim 9, wherein the plurality of movable structures have substantially the same layout from top view.

15. The out-of-plane sensor of claim 14, wherein each of the movable structures has the same layout as compared with another movable structure, but is 0°, 90°, 180°, or 270° rotated.

16. The in-plane sensor of claim 9, wherein the at least one fixed part or the at least one movable part which includes the plurality of uniformly distributed openings further includes at least one semi-opening at a periphery side of the at least one fixed part or the at least one movable part to reduce a continuous length of the periphery side of the at least one fixed part or the at least one movable part.

* * * * *